No. 854,363. PATENTED MAY 21, 1907.
C. D. LANNING.
MAGNET BOX AND ARMATURE OF MAGNET CONTAINED THEREIN.
APPLICATION FILED JAN. 26, 1906.

2 SHEETS—SHEET 1.

Inventor
Charles D. Lanning

Witness
Alice Richmond Brown.
Blanche A. Spencer.

No. 854,363. PATENTED MAY 21, 1907.
C. D. LANNING.
MAGNET BOX AND ARMATURE OF MAGNET CONTAINED THEREIN.
APPLICATION FILED JAN. 26, 1906.

2 SHEETS—SHEET 2.

Witnesses.
Alice Richmond Brown
Blanche A. Spencer

Inventor
Charles D. Lanning

UNITED STATES PATENT OFFICE.

CHARLES D. LANNING, OF BOSTON, MASSACHUSETTS.

MAGNET-BOX AND ARMATURE OF MAGNET CONTAINED THEREIN.

No. 854,363.  Specification of Letters Patent.  Patented May 21, 1907.

Application filed January 26, 1906. Serial No. 297,987.

*To all whom it may concern:*

Be it known that I, CHARLES D. LANNING, a citizen of the United States of America, residing at Boston, in the county of Suffolk and Commonwealth of Massachusetts, have invented certain Improvements in Magnet-Boxes and Armatures of Magnets Contained Therein, of which the following is a specification.

The invention relates to magnet boxes and the armature of the magnets contained therein, particularly for use in locations where the magnets are liable to injury, and consists in the simplification and convenience of the construction of such boxes and arrangements of parts therein, which will be readily understood from the description following, in connection with the accompanying drawings wherein—

Figure 1:
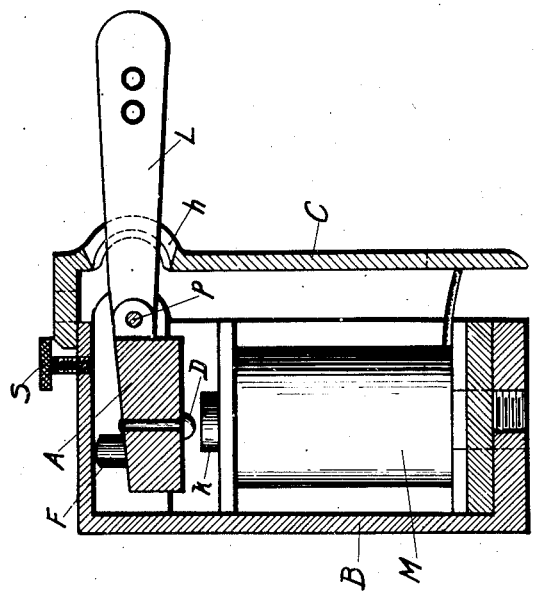
Figure 2:
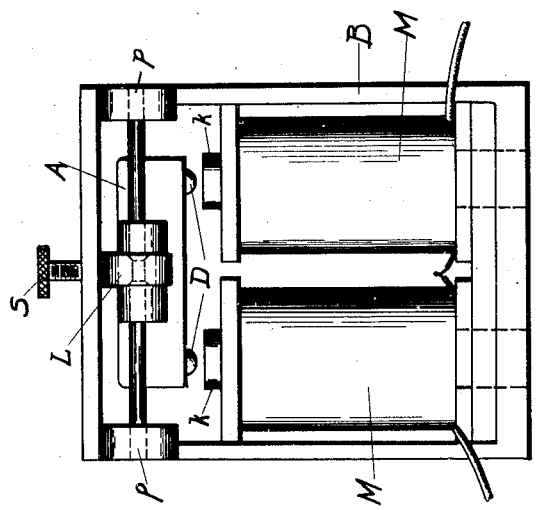
Figure 3:
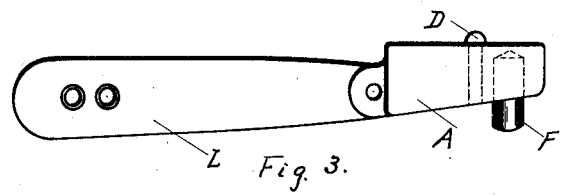
Figure 4:
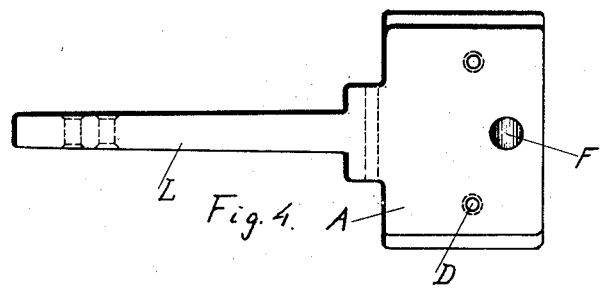
Figure 5:
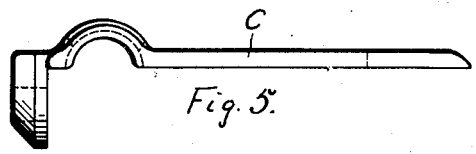
Figure 6:
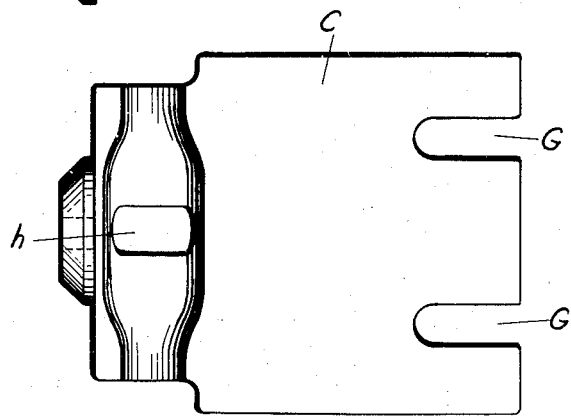

Figure 1 is a sectional side elevation of the box and contained parts with the cover partially removed; Fig. 2 is a front elevation of the box, with the cover removed; Fig. 3 is a side elevation of the magnet armature and lever; Fig. 4, a plan of the same; Fig. 5 is a side elevation of the cover; Fig. 6 a front elevation of the same.

Referring to the drawings, B is the box of magnetic material, C its cover, M the two coils of the magnet, $k$ the cores of the magnet which extend down and are electrically connected with the bottom of the box B, which serves as their yoke; A is the armature, L the armature lever, pivoted in the box at $p$.

D are diamagnetic pieces between the armature and magnet cores, to prevent metallic contact, which pieces may conveniently be made in the form of pins with heads, inserted in the armature in positions coincident with the poles of the magnet, as illustrated in Figs. 1 and 2.

A hole $h$ is formed in the cover C in proper position to permit the lever L to pass through when the cover is applied, and when the cover is secured in place upon the box by the screw S, it will control the lever laterally and maintain the armature and diamagnetic pieces D in proper alinement with the cores $k$. Also a stud or stop F may be secured to the upper side of the armature A to control its position in relation to the magnet. Slots G may be made in the lower edge of the cover for the circuit connections with the magnet.

This improved construction will be found extremely simple, convenient and economical, and one which can be placed in position readily and the armature and its lever easily removed and replaced without disturbing the box and its electric connections, which is very advantageous when used in connection with electrical stop mechanism in looms, where these devices are usually subjected to sudden and severe shock when operated.

I claim:

1. In electro-magnetic apparatus, a magnet-container, a magnet therein, an armature lever pivoted to the container, diamagnetic pieces between the armature and magnet poles, a container-cover, and means thereon to control the lateral movement of the armature lever, and maintain the armature and the diamagnetic pieces in coöperative alinement with the cores of the magnet when the cover is applied to the container.

2. In electro-magnetic apparatus, a double core electromagnet, a magnet-box of magnetic material to which the magnet cores are attached and which serves as the yoke therefor, an armature-lever pivoted upon the box, diamagnetic pieces between the armature and the magnet poles, a cover and means thereon to control the lateral position of the armature lever and maintain the armature and diamagnetic pieces in alinement with the magnet cores when the cover is properly located upon the box.

CHARLES D. LANNING.

Witnesses:
 FLORENCE A. COLLINS,
 REUBEN L. ROBERTS.